United States Patent [19]

Nakano et al.

[11] Patent Number: 4,710,435
[45] Date of Patent: Dec. 1, 1987

[54] METHOD FOR PRODUCTION OF SINTERED COMPOSITE HAVING SPINEL REINFORCED WITH SHORT FIBERS OF SILICON CARBIDE AND SINTERED COMPOSITE PRODUCED BY SAID METHOD

[75] Inventors: Kikuo Nakano; Hiroshi Hayashi, both of Aichi, Japan

[73] Assignees: Agency of Industrial Science & Technology; Ministry of International Trade & Industry, both of Tokyo, Japan

[21] Appl. No.: 925,560

[22] Filed: Oct. 31, 1986

[30] Foreign Application Priority Data

Nov. 18, 1985 [JP] Japan ................................ 60-258333

[51] Int. Cl.$^4$ ............................................. C04B 35/56
[52] U.S. Cl. ...................................... 428/698; 156/89; 264/65
[58] Field of Search ........................... 156/89; 264/65; 428/698

[56] References Cited

U.S. PATENT DOCUMENTS

| | | | |
|---|---|---|---|
| 3,992,725 | 11/1976 | Homsy | 428/16 X |
| 4,059,664 | 11/1977 | Nicholas et al. | 264/65 X |
| 4,129,470 | 12/1978 | Homsy | 264/49 X |
| 4,158,687 | 6/1979 | Yajima et al. | 264/65 X |
| 4,296,921 | 10/1981 | Hayashi | 138/172 X |
| 4,324,843 | 4/1982 | Brennan et al. | 428/698 X |
| 4,341,826 | 7/1982 | Prewo et al. | 428/698 X |
| 4,435,455 | 3/1984 | Prewo et al. | 428/697 X |
| 4,588,699 | 5/1986 | Brennan et al. | 428/698 X |
| 4,589,900 | 5/1986 | Brennan et al. | 428/698 X |
| 4,626,461 | 12/1986 | Prewo et al. | 428/698 X |

Primary Examiner—Henry F. Epstein
Attorney, Agent, or Firm—Oblon, Fisher, Spivak, McClelland, & Maier

[57] ABSTRACT

A sintered composite having spinel reinforced with short fibers of silicon carbide is produced by preparing a slurry consisting of spinel powder, short fibers of silicon carbide, and a solvent, drying and pulverizing the slurry, and sintering the produced powder. The sintered composite produced as described above has silicon carbide homogeneously dispersed in a matrix of spinel and, therefore, possesses great strength and excels in toughness.

2 Claims, 1 Drawing Figure

METHOD FOR PRODUCTION OF SINTERED COMPOSITE HAVING SPINEL REINFORCED WITH SHORT FIBERS OF SILICON CARBIDE AND SINTERED COMPOSITE PRODUCED BY SAID METHOD

FIELD OF THE INVENTION AND RELATED ART STATEMENT

This invention relates to a method for the production of a sintered composite having spinel reinforced with short fibers of silicon carbide (hereinafter referred to simply as "sintered spinel-SiC composite") which is suitable as a material for valves, cocks, and container pipes which are required to be resistant to chemicals and gases and as a material for such parts as burners, internal parts for furnaces, core tubes for furnaces, and wire-drawing dies which are exposed to elevated temperatures and relates also to the sintered composite produced by the method described above. The sintered spinel-SiC composite which is obtained by the present invention is stable particularly in an oxidizing atmosphere and gains in plasticity to some extent at elevated temperatures and, therefore, withstands deformation to some extent.

Since ceramics generally offer high resistance to heat and oxidation and exhibit great strength at elevated temperatures, they are attracting growing attention as structural materials designed to be exposed to particularly harsh conditions.

In recent years, such ceramics are required to offer further improved physical properties. To meet this demand, it is currently the practice to produce composites incorporating reinforcing fibers, i.e. the so-called sintered composites which, owing to the incorporation of such reinforcing fibers, enjoy higher strength and higher toughness than pure ceramics.

The fibers to be used for incorporation in the sintered composites include continuous fibers and such short fibers as whiskers.

This invention relates to a method for the production of a sintered composite containing short fibers of silicon carbide and to the sintered composite produced by the method. In the production of a sintered composite using short fibers, the sintered composite can be obtained in any complicated shape because the raw materials therefor can be freely formed before sintering. The invention is also characterized by the fact that it can be obtained by a simple method.

Two papers regarding a sintered ceramic composite incorporating short fibers of silicon carbide have been published, one titled "Fabrication of SiC Whisker-$Si_3N_4$ Composite Materials and Their Physical Properties" by Nobuyuki Tamari, Toru Ogura, Makoto Kinoshita, and Yasuo Toibana which appeared in "Osaka Research Institute of Industrial Technology Quarterly, 33 (1982) 129" and the other titled "Mechanical Properties of Silicon Carbide/Mullite Composite Material" by Shiushichi Kimura, Eiichi Yasuda, Yashuhiro Tanabe, and Yasushi Katano which appeared in "Glossary of Lectures at 1985 Annual Meeting of Ceramics Association, p 637 (1985)".

The sintered composites described in these papers are produced as described below. The sintered composite using SiC whiskers and $Si_3N_4$ is obtained by adding 5% of powdered MgO to $Si_3N_4$ matrix powder as a sintering agent, further adding to the resulting mixture 10 to 30% by weight of SiC whiskers, dispersing the mixture ultrasonically in an aqueous 10% polyvinyl alcohol solution, quickly filtering the produced dispersion with a sieve, producing a sheet $20 \times 40 \times 1$ mm in size of the residue of filtration, superposing several of such sheets, and hot pressing the superposed sheets in a carbon mold.

The sintered silicon carbide/mullite composite material is obtained by mixing "($CH_3O_4Si$ + sec-butyl alcohol)" with an ultrasonic dispersion of "SiC whiskers + sec-butyl alcohol", admixing the resulting mixture with "$Al(OC_4H_4)_3$ + sec-butyl alcohol", drying the resultant mixture, calcining the dried mixture thereby producing a powdered raw material, and hot pressing the powdered raw material at 1,660° C. under 200 kg/cm².

Although the sintered composite using SiC whiskers and $Si_3N_4$ possesses a greater fracture energy than the sintered of $Si_3N_4$, it has the following disadvantage.

It suffers from loss of bending strength and breaking toughness ($K_{IC}$).

The sintered silicon carbide/mullite composite material possesses an increased bending strength but it has no plasticity and is frangible.

OBJECT AND SUMMARY OF THE INVENTION

The inventors continued a study with a view to developing a sintered composite possessing better qualities than the conventional sintered composites. The present invention has been perfected as the result.

Sintered composites incorporating short fibers of silicon carbide in the matrix component are not always superior in strength and toughness to sintered masses using matrix components alone. For example in a sintered composite, if the short fibers of silicon carbide react with a matrix component, the sintered composite cannot be expected to exhibit improved strength and toughness. For the produced sintered composite to acquire the desired improved strength and toughness, the matrix component to be used in combination with the short fibers of silicon carbide for the production of the sintered composite must be selected so as to ensure higher strength and toughness than those of a sintered mass formed solely of a matrix component. Generally, it is safe to conclude that a matrix component incapable of reacting with the short fibers of silicon carbide is suitable for this purpose.

After the aforementioned study, the inventors chose spinel ($MgO \cdot Al_2O_3$) as a matrix component.

To be specific, this invention relates to a method for the production of a sintered composite having spinel reinforced with short fibers of silicon carbide, characterized by preparing a slurry consisting of powdered spinel, 10 to 70% by weight, based on the powdered spinel, of short fibers of silicon carbide, and a suitable solvent, then drying and pulverizing the prepared slurry thereby obtaining a homogeneous mixture of the spinel with the short fibers of silicon carbide, and sintering this mixture in a non-oxidizing atmosphere at a temperature in the range of 1,500° to 1,950° C. under a pressure in the range of 100 to 500 atmospheres for a prescribed length of time and also relates to the sintered composite produced by the method described above.

BRIEF DESCRIPTION OF THE DRAWING

The drawing is a photograph of a composite produced by the method of this invention, taken through an electron microscope at 300 magnifications.

DETAILED DESCRIPTION OF THE PREFERRED EMBODIMENT

The spinel is composed of MgO and $Al_2O_3$. Desirably, the molar ratio of MgO to $Al_2O_3$ falls in the range of 1:1 to 1:1.5, preferably 1:1 to 1:1.3. Further, the spinel is desired to be in a powdered form, with the individual particles having a particle diameter of not more than 3 microns. If the particle diameter is larger, the spinel is not thoroughly mixed with silicon carbide and the sintered composite consequently acquires a coarse texture.

The short fibers of silicon carbide to be incorporated in the composite are desired to be the so-called SiC whiskers having an average diameter in the range of 0.5 to 2 microns and a length in the range of 5 to 100 microns. If the short fibers of silicon carbide are excessively short, the strength and toughness acquired by the produced sintered composite are substantially the same as those of a sintered mass formed solely of spinel. If the short fibers are too large, the short fibers of silicon carbide are dispersed insufficiently and the sintered composite itself acquires a coarse texture and exhibits insufficient strength and, consequently, has low commercial value.

In the first step of the present invention, powdered spinel is mixed with the short fibers of silicon carbide. In this mixing, it is necessary that the amount of the short fibers of silicon carbide should fall in the range of 10 to 70% by weight, based on the amount of the powdered spinel. If the amount of the short fibers of silicon carbide is less than 10% by weight, the incorporation of the short fibers of silicon carbide brings about substantially no effect. If this amount exceeds 70% by weight, the proportion of the spinel in the composite is so small that the characteristic qualities inherent in the spinel itself are no longer manifested. Preferably, the amount of the short fibers of silicon carbide is in the range of 10 to 30% by weight, based on the amount of the spinel.

To ensure thoroughly uniform mixing of the powdered spinel with the short fibers of silicon carbide, the present invention carries out this mixing in a suitable solvent which is capable of permitting very smooth dispersion of the powdered raw materials, giving rise to a homogeneous slurry. Desirably, the slurry concentration is such that the solids content thereof falls in the range of 150 to 300 g/liter. The solvent to be used for this mixing can be any of the conventional solvents adopted for the mixing of this sort. From the practical point of view, an alcohol incorporating therein an organic dispersant proves particularly desirable. Then, the slurry is stirred until it is dried and the solvent is expelled, thus obtaining a mass of mixture. This mass of mixture is readily pulverized on exposure to a slight impulse. The powder thus obtained is a perfectly homogenous powder. This powder is heated in a nonoxidizing atmosphere such as an inert atmosphere of argon or nitrogen, for example, or under a vacuum at a temperature in the range of 1,700° to 1,950° C. under a pressure of not less than 100 atmospheres for a prescribed length of time. Consequently, there is obtained a sintered composite having the spinel reinforced with the short fibers of silicon carbide. The accompanying drawing is a photograph of the sintered composite obtained as indicated in Example 1 by the method of this invention, taken through an electron microscope at 300 magnifications.

The sintered spinel-SiC composite of this invention produced by the method of this invention possesses great strength and exhibits plasticity to some extent at elevated temperatures as compared with the sintered mass formed solely of spinel. The strength of the sintered composite is 40 to 80% greater than that of the sintered mass formed solely of spinel, though variable with the amount of the short fibers of silicon carbide incorporated. For this sintered composite to manifest the plasticity conspicuously, the proportion of alumina in the spinel is desired to be increased ($MgO:Al_2O_3 \approx 1:1.5$, for example).

Now, the present invention will be described more specifically below with reference to working examples.

EXAMPLE 1

A spinel powder (composed of 28.2% of MgO, 71.7% of $Al_2O_3$, 0.03% of $Fe_2O_3$, 0.038% of $SiO_2$, and 0.0024% of $Na_2O$ by weight) having an average diameter of 0.5 micron was mixed with 20% by volume (18.2% by weight) of SiC whiskers (having an average diameter of 0.5 micron and an average length of 20 microns). The resulting mixture was stirred in ethanol, a solvent, to produce a slurry (having a solids concentration of 250 g/liter). This slurry was dried by heating at 60° C. to obtain a mass of mixture. The mass of mixture was crushed with spoon to produce a powdered raw material. Then, the powdered raw material was hot pressed in an atmosphere of argon at 1,850° C. for 1 hour under a pressure of 300 kg/cm² to give rise to a sintered composite sample. The powder of the sample thus obtained was analyzed by X-ray diffraction. The results are shown in Table 1. The chemical composition of the sample is shown in Table 2. The photograph of the sample taken through an electron microscope is shown in the drawing.

TABLE 1

| X-ray diffraction of sintered composite (sintered spinel-SiC composite) | | |
|---|---|---|
| Spacing (Å) | Surface index | Remark |
| 2.86 | 220 | S |
| 2.52 | 006, 102 | C |
| 2.44 | 311 | S |
| 2.34 | 103 | C |
| 2.02 | 400 | S |
| 1.65 | 422 | S |
| 1.56 | 511 | S |
| 1.54 | 108, 110 | C |
| 1.43 | 440 | S |
| 1.31 | 10, 10, 116 | C |
| 1.28 | 533 | S |
| 1.17 | 444 | S |

S: Spinel
C: β-SiC.

TABLE 2

| Chemical composition of sintered composite (sintered spinel-SiC composite) | |
|---|---|
| Name of element | Composition (%) |
| $SiO_2$ | 1.39 |
| SiC | 10.12 |
| $Fe_2O_3$ | 0.39 |
| $Al_2O_3$ | 54.00 |
| CaO | 3.72 |
| MgO | 29.03 |
| $TiO_2$ | — |
| MnO | 1.40 |
| $P_2O_5$ | 0.22 |
| $Na_2O$ | 0.43 |
| $K_2O$ | — |
| Total | 100.70 |

The drawing represents a photograph of a composite of this invention produced by the method of this invention, taken through an electron microscope (at 300 magnifications). In the photograph, the portions appearing in white are the shades of SiC whiskers.

Then, a test piece of the sintered spinel-SiC composite produced as described above was tested for bending strength.

The test piece 3×4×40 mm cut from the sintered spinel-SiC composite and finished by grinding was tested for bending strength at room temperature by the three-point bending method (interval of span 30 mm).

A test piece obtained in entirely the same manner as described above from a sintered mass formed solely of spinel was tested for bending strength.

The results are shown in Table 3.

TABLE 3

Bending strength of sintered spinel-SiC composite and sintered mass solely of spinel (kg/mm$^2$)

| Sintered spinel-SiC composite | Sintered mass of spinel |
|---|---|
| 24.9, 24.8, 22.0, 21.8 | 12.3, 12.8, 14.4 |
| average 23.4 | average 13.2 |

It is noted from this table that the strength of the sintered spinel-SiC composite was about 78% higher than that of the sintered mass formed solely of spinel.

EXAMPLE 2

A powdered raw material for sintering was obtained by following the procedure of Example 1, except that the amount of SiC to be incorporated was changed to 30% by volume (27.6% by weight). This powdered raw material was hot pressed in an atmosphere of argon at 1,850° C. for 1 hour under a pressure of 300 kg/cm$^2$. A sample of the resulting sintered composite (sintered spinel-SiC composite) was analyzed by X-ray diffraction. The results were substantially the same as those shown in Table 1. The chemical analyses of this sample are shown below.

| Component | Percentage composition (%) |
|---|---|
| SiO$_2$ | 0.94 |
| SiC | 22.49 |
| Fe$_2$O$_3$ | 0.04 |
| Al$_2$O$_3$ | 54.66 |
| CaO | 0.01 |
| MgO | 18.20 |
| TiO$_2$ | — |
| MnO | 0.13 |
| Na$_2$O | 0.03 |
| K$_2$O | — |
| C | 5.0 |

The bending strength of a test piece taken from this sample at room temperature was as shown below. (three-point bending strength)

Strength of sintered composite (Kgf/mm$^2$)
25.3, 25.2, 24.7, 24.3
average 24.9

As demonstrated above, the sintered spinel-SiC composite produced by the method of this invention possesses much higher strength than the conventional sintered mass formed solely of spinel, it is also somewhat plastic, and is suitable as a material for valves, cocks, and container pipes which require resistance to chemicals and to gases and as a material for such parts as burners, inner parts of furnaces, core tubes of furnaces, and wire drawing dies which require stability to withstand intense heat.

What is claimed is:

1. A sintered composite having spinel reinforced with short fibers of silicon carbide, which comprises a spinel matrix containing MgO and Al$_2$O$_3$ in a molar ratio in the range of 1:1 to 1:1.3 and 10 to 30% by weight, based on said spinel matrix, of short fibers of silicon carbide having an average diameter in the range of 0.5 to 2 microns and a length in the range of 5 to 100 microns.

2. A method for the production of a sintered composite having spinel reinforced with short fibers of silicon carbide, comprising mixing powdered spinel containing MgO and Al$_2$O$_3$ in a molar ratio in the range of 1:1 to 1:1.3 with 10 to 30% by weight, based on said spinel, of short fibers of silicon carbide having an average diameter in the range of 0.5 to 2 microns and a length in the range of 5 to 100 microns, and an organic solvent thereby obtaining a slurry having a solid content in the range of 150 to 300 g/liter, stirring and drying said slurry thereby expelling said organic solvent and obtaining a mixed mass, pulverizing said mixed mass thereby obtaining a homogeneous mixture of spinel and silicon carbide short fibers, and sintering said mixture in a nonoxidizing atmosphere at a temperature in the range of 1700° to 1,950° C. under at least 100 atmospheres for a fixed period.

* * * * *